May 24, 1938.  J. GOOD  2,118,401

AUTOMOTIVE ENGINE CONTROL SYSTEM

Filed May 26, 1934   3 Sheets-Sheet 1

John Good
INVENTOR

BY Jeffrey Kimball Peyster
ATTORNEYS

May 24, 1938.    J. GOOD    2,118,401
AUTOMOTIVE ENGINE CONTROL SYSTEM
Filed May 26, 1934    3 Sheets-Sheet 2
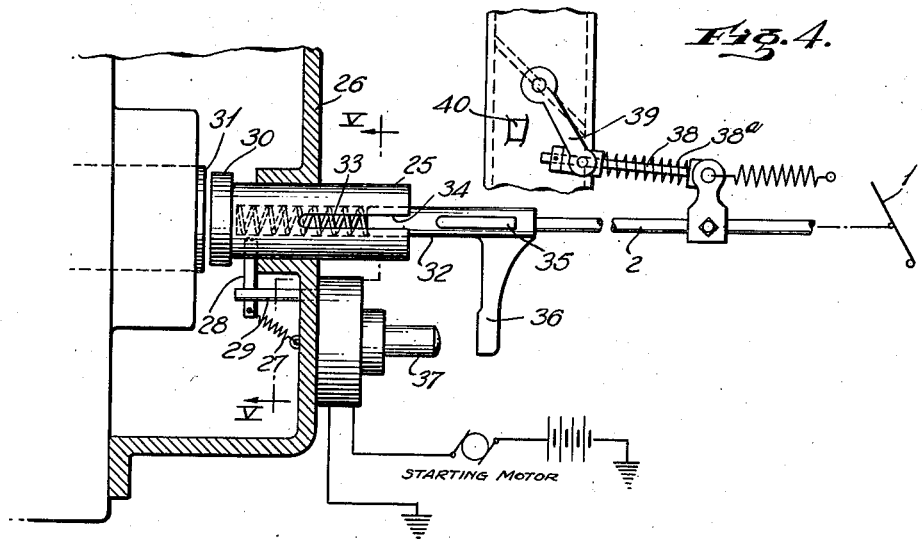
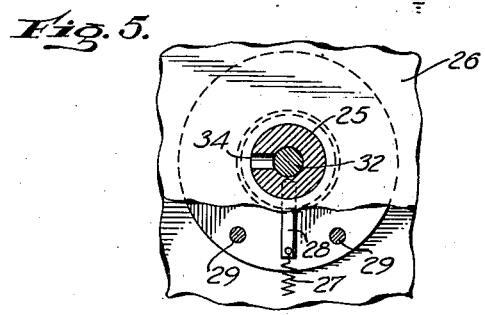
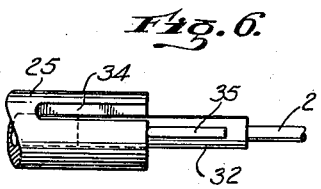
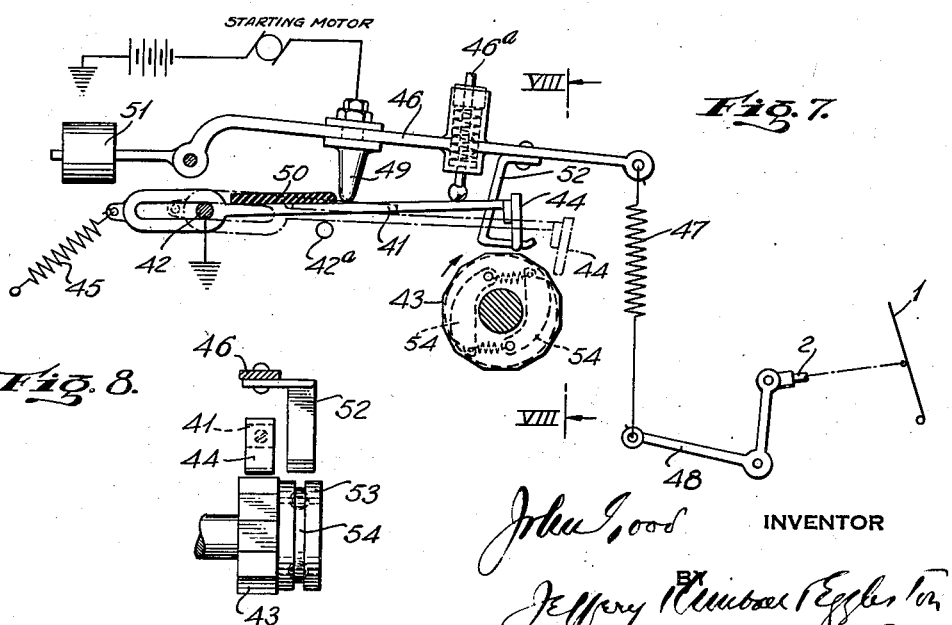
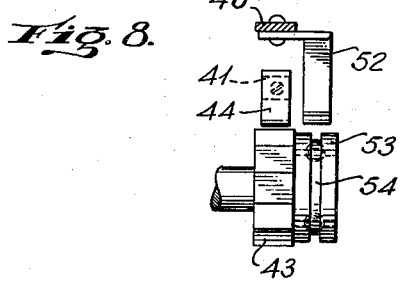
INVENTOR
ATTORNEYS May 24, 1938.    J. GOOD    2,118,401
AUTOMOTIVE ENGINE CONTROL SYSTEM
Filed May 26, 1934    3 Sheets-Sheet 3

INVENTOR
BY
ATTORNEYS

Patented May 24, 1938

2,118,401

UNITED STATES PATENT OFFICE 2,118,401

AUTOMOTIVE ENGINE CONTROL SYSTEM

John Good, Garden City, N. Y., assignor to Automatic Motor Stop and Start, Inc., New York, N. Y., a corporation of New York Application May 26, 1934, Serial No. 727,680

10 Claims. (Cl. 123—179)

The invention relates to control systems for automotive vehicles, being more particularly concerned with the control of the engines and the starting or cranking thereof when that is done by the use of one of the operator's pedals or control members which also serves some other function in the vehicle. A principal object is to provide thoroughly reliable means for preventing the use of such control pedal for its engine-cranking function except only when the engine is totally dead or inactive. Dual function pedals as heretofore employed are subject to the objection that under certain conditions they may function to crank the engine when it is turning over, with risk of serious consequences. This is made impossible by the present invention according to which one of the functions of the dual function member, e. g., the cranking, is made dependent on a motion-responsive element or feeler which, by the action of said member is brought into connection with some part or thing receiving motion from the engine crank shaft and acts by virtue of its resulting displacement or non-displacement to prevent any undesired or improper use or action of such control member. This being the immediate object, the invention independently contemplates the organization of motion-responsive feeler elements for the control of the cranking or other agencies in automotive vehicles, whether operated by dual function members or otherwise, and as will hereinafter become apparent.

The preferred and several variant forms of embodiment of the principles of the invention are shown in the accompanying drawings, all in more or less diagrammatic form and wherein—

Fig. 1 shows a mode of application of the invention to a conventional automobile engine.

Fig. 2 a larger scale vertical section of the feeler mechanism used in Fig. 1.

Fig. 3 a section of Fig. 2 on line III—III.

Fig. 4 a modification illustrating the use of a shaft end as the crank-shaft driven member.

Fig. 5 a section thereof on line V—V.

Fig. 6 a detail of this form.

Fig. 7 another embodiment of the invention with additions.

Fig. 8 a section thereof on line VIII—VIII.

Figure 1:
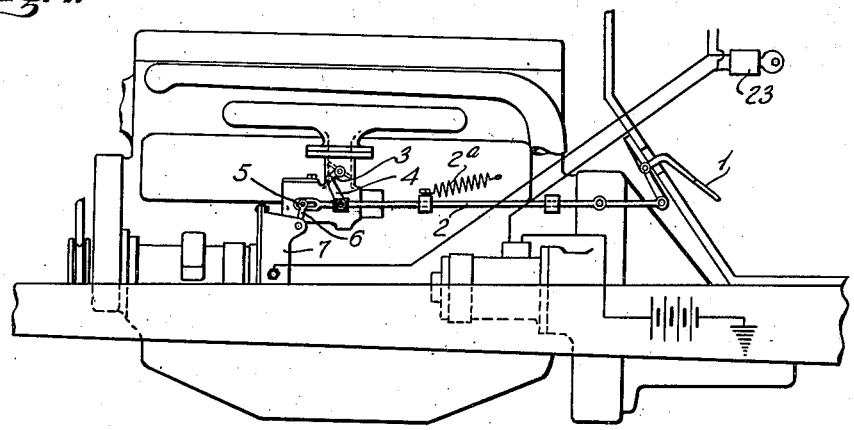
Figure 2:
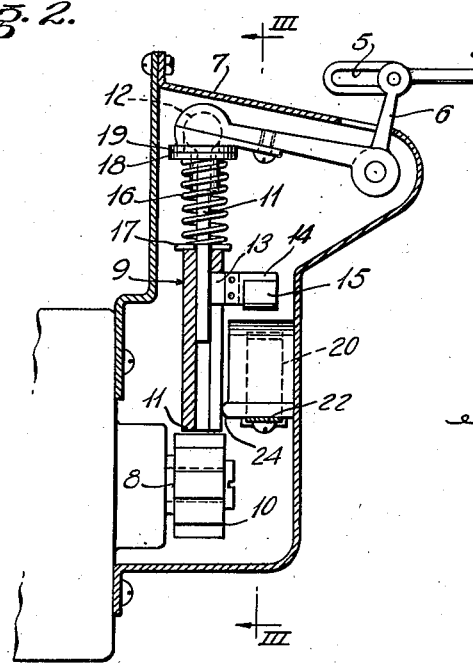

In Fig. 1 the dual function control member is indicated as a pedal marked 1, which serves the two functions of throttle control and engine cranking, according to circumstances. The linkage or operating connections by which it performs these functions and the mode of operation thereof will of course vary according to the layout of the different power plants in which the invention is employed. For the simple organization indicated in this figure, it comprises merely a reciprocating push rod 2, appropriately guided and connected to the throttle crank 3 by means of a strut link 4, which, when moved by the rod to a vertical or dead-center position with relation to the throttle crank, opens the throttle to its widest extent and when moved beyond this dead center position pulls the throttle crank back or down to a more or less closed-throttle position, intended for engine cranking. Suitable stops for limiting the rod or throttle movement as desired will be understood to be present, though not illustrated, and the parts are returned to normal by the usual throttle spring 2a.

The overthrow movement of the push rod 2 beyond the dead center, in the present case takes up the lost motion represented by the slot 5 at the end of the rod 2 and thereupon actuates the bell crank 6 of the feeler mechanism and as permitted by the latter actuates the cranking agency of the engine, as presently described, but only provided the engine is not turning over. According to this design the normal use of the pedal to control the throttle, and hence the vehicle speed, takes place within the limits of the lost motion slot, this being a preferred but not an indispensable relation between the feeler and throttle, as will presently appear. The work arm of the bell crank 6 is enclosed within a compact casing 7, which is mounted on the end of the generator in cases where the generator shaft or a part thereon is the moving part of the engine selected for the purpose of control. The generator is preferred in this connection, because of the convenience of its location in most engines and because its armature shaft 8 is ordinarily driven at a somewhat higher speed than the crank shaft. The casing 7 is readily attached to such generators in most makes of vehicles. The bell crank arm carries or connects with or operates a feeler element 9, which is thereby adapted to be advanced by the depression of the pedal 1 into contact with a collar 10 made fast to the end of the armature shaft 8. This collar receives motion from the engine crank shaft whenever the latter is turning but as indicated above any other member or part of the power plant, such as the surface of the fly wheel for example, in motion when the crank shaft is rotating, may be utilized for the same purpose. Preferably the collar 10 is a many sided polygon which, in some cases, may act as a cam. The feeler element 9 in this case is a simple hard fibre sleeve, telescoped on one end of a plunger shank 11, the other end of which is loosely jointed as by means of the ball and socket type joint 12 to the end of the bell crank arm. The fibre sleeve is slotted for a part of its length to accommodate a lateral arm 13 fixed on the shank 12, to the end of which is riveted a piece of insulation 14, carrying a copper switch or bridge piece 15 presently referred to. The spring 16, interposed between a washer 17 on or at the end of the fibre sleeve and another washer or flanged collar 18 slidingly mounted on the shank, serves two purposes, first, of urging the fibre sleeve downwardly until it seats by the top of its slot against the top of the lateral plunger arm 13 and second, of holding the plunger or shank yieldingly in a predetermined angular relation to the arm of the bell crank. This latter action is by virtue of the pressure of the flat face of the sliding collar 18 against the flat face 19 of the socket joint 12; when the shank is pushed to one side or the other it springs back to its normal position indicated in full lines, as soon as released; it may be moved laterally against the pressure of the spring 16, in any direction with reference to the arm. The spring is thus both a feeler spring and a centering spring.

When the bell crank is operated by pedal depression, or by such other control member as may be at the command of the operator, the feeler is advanced into contact with the collar 10. If the collar is rotating the effect is to deflect or displace or bend the feeler element to one side or the other according to the direction of motion, so that continued depression of the element will cause the lateral arm thereon or, more particularly, the copper bridge piece 15 to slide down the side surface of one or the other of the insulating blocks or guards 20 and 21, which guards are fastened to the feeler casing in the present case. No function is performed by such movement and the push rod 2 may be advanced as far as it will go.

If, however, the engine is dead and collar 10 therefore not rotating, the feeler will not be deflected by it and the downward movement will result in compression of the feeler spring and cause the lateral arm and the copper bridge piece thereon, to enter the crevice between the guards 20 and 21 and bridge the gap between the two electrical terminals 22 housed within the guards. These terminals may be connected directly in the starting motor circuit or they may be in a relay circuit for controlling the cranking device or causing such other effect as it is desired to produce; in any event, they are considered in this form as constituting or representing the cranking device, whether mechanical or electrical, the essential point being that when the feeler is not deflected by its engagement with the collar 10, a different effect is produced than when it is. As indicated in Fig. 1, a relay circuit is indicated as closed by the feeler, which circuit includes the ignition switch 23, so that in this case the engine cannot be cranked unless the ignition is turned on.

Figure 3:
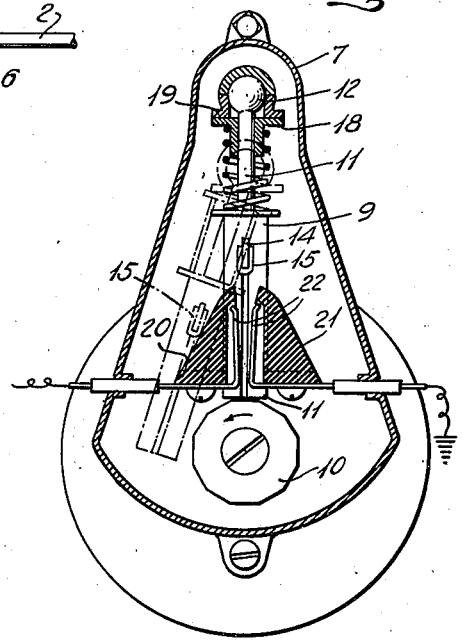

It will be understood that the parts are so organized that when the circuit gap 22 has been closed the engine throttle will have attained a desired degree of opening suited for the particular engine and carburetor, but it will be apparent that the time of contact between the fibre sleeve and collar 10 may occur at any point in the range of pedal depression, since if the engine is in action, the bridge piece 15 will not enter the crevice but will merely play back and forth on the sloping side of the guard. This position is indicated by the dotted lines in Fig. 3, wherein it will be observed that the slope of the guards keeps the feeler from rubbing on the rotating collar 10 thereby avoiding undue wear or noise if the feeler should be of metal. A hard fibre feeler is quiet and highly wear-resisting. Very slight engine motion is sufficient to deflect the feeler so that it will not enter the crevice between the guards and is effective for this purpose in either direction of motion, thus guarding against the possibility that the pedal might be depressed at the instant when the crank shaft was rocking backward or reversely under the influence of compression or premature ignition. Guarding against the engagement of the starting mechanism under such circumstances is important and has not been accomplished by any form of preventer mechanism heretofore proposed for cranking control so far as I am aware. The rib 24 on the inner face of the guard members is for guiding the descent of the feeler, keeping it in a nearly vertical plane.

The fundamental principles of this invention are illustrated in the figures just described and it will be apparent that they can be variously incorporated in engine power plants. The remaining figures illustrate merely some of the variant forms which are possible, but without implying any restriction thereto, either as respects the character of the control member or the feeler or the means or method of translating the effect of its displacement to other agencies. The term "feeler" is used herein as referring to any member advanceable into contact with an engine-driven part or surface for the purpose of determining whether or not such surface is in motion, and the term "translating means" is used herein as referring to the instrumentality whereby the effect of motion or non-motion on the feeler is made effective in the control of the engine.

Figs. 4, 5, and 6 represent an appropriate mode of application when the end of some crank-shaft driven member is the member most convenient for co-action with the feeler. In this case the feeler is represented by a sleeve 25, axially aligned with the shaft and mounted to slide and also turn within a limited arc in the boss of a suitable casing wall 26, both of these movements being against the tension of a single spring 27 connected to the arm 28 on the sleeve, which arm is confined to play between two fixed stops 29. The tension of the spring holds the sleeve normally in a retracted and centered position with the arm 28 midway between the stops 29, as indicated in Fig. 5. The contact member of the feeler sleeve may be fibre disc 30 and is normally separated from the end of a crank-shaft driven shaft, marked 31, by a narrow crevice. The push rod 2, which corresponds to the push rod in the preceding figures, is in this case connected to the feeler shank 32, which telescopes within the feeler sleeve 25 against the pressure of the feeler spring 33 therein, so that endwise movement of the rod will advance the feeler resiliently into contact with the shaft end 31, thereby causing it to partake of the motion of the latter in one direction or the other, as the case may be. When the feeler is thus moved or displaced by the rotation of shaft 31, its longitudinal slot 34 becomes disaligned with the key member 35 on the shank 32 so that continued advance of the shank into the sleeve, or continued movement of rod 2, will cause such key to impinge on the square end of the sleeve, at one side of the slot and be blocked thereby, thus preventing any further advancing movement. When, however, there is no displacement of the sleeve, the key 35 enters the slot and the continued advancing movement of the shank and rod will carry its rigid bracket arm 36 into engagement with the starter switch button or cranking device represented diagrammatically by 37 and the engine will be cranked. These figures also illustrate a different method of throttle control, when the pedal 1 is an accelerator pedal as in all the cases here shown. The push rod 2 is connected through a side link 38 with the throttle crank 39, the connection between link and crank being sliding or telescopic as indicated, so that when the crank has been fully opened against its back stop 40, the push rod may be continued in movement for actuating the cranking device 37. In such case the link pushes through the swivel on the crank compressing the spring 38ª and the throttle is wide open when the engine is cranked; the cranking occurs by virtue of the overrun motion.

In Figs. 7 and 8 the feeler element here marked 41 is reciprocating, being mounted to slide on or in relation to a fixed part or post 42 and is adapted to be advanced into contact with the rotating surface 43, the contact being made by a block of hard fibre 44 fastened to its end. It is normally held retracted and out of contact with the rotating surface 43 by a tensile spring 45 and it is electrically grounded in any suitable way. Its actuating or advancing means is represented by a lever 46 adapted to bear upon it through the medium of a spring-pressed plunger 46ª, or like yielding device. The lever 46 is connected through a spring 47 of predetermined tension, to be pulled toward the feeler by the bell crank 48, the latter being connected to the pedal 1. Its advancing movement presses the feeler block 44 against the rotating surface 43 and if the latter is stationary, permits the insulated electric terminal 49 to engage with the metal part of the feeler member, which, as stated, is grounded thus closing the starting circuit or a relay starting circuit as the case may be. If, however, the engine is in motion, the contact of the feeler therewith instantly causes the feeler to be drawn to the right (dotted lines) so that the electric terminal 49 will engage the insulating plate 50 on the feeler 41 instead of the metallic part thereof and the cranking circuit will not be closed.

The full line position of the feeler in Fig. 7 indicates the starting circuit closed and in consequence of such closure the surface 43 will begin to rotate, being driven at first by the power of the starting motor. Such motion however cannot displace the feeler because it is locked against displacement by the edge of the insulation 50 which then abuts against the side of the electric terminal 49. This condition can be arranged to continue as long as the pedal is held depressed, if desired, or it can be stopped automatically when the engine begins to fire. Two means for this purpose are shown in these figures and one or both may be employed. One of them is represented by the spring 47 and the counterweight 51 carried on the actuating lever 46 and which is so designed as to its moment on the lever that the vibration imparted to the feeler by the increased speed imparted to the rotating polygon incident to the firing, will throw the lever upward far enough to permit it to unlock from the terminal and allow the feeler to be drawn to the right, where it will rest on the stop pin 42ª. This interposes the insulation 50 under the electric terminal so that continued depression of the pedal cannot close the circuit. The feeler is thus jiggled to an unlocked position.

A more positive means of throw-off is represented by the shoe 52, fast to the lever 45, and normally overlying a hub part 53 of the rotating member 43, which latter houses spring-retracted centrifugal weights 54, similar in principle to the inertia governor. When the part 43 rotates at the speed normal for it under engine firing conditions, the weight striking the shoe throws the actuating lever upwards, against the pull of spring 47, and breaks the circuit, preventing its re-closure as long as the sufficient rotation of the weights continues. When this throw-off is employed it will cooperate with the feeler in preventing circuit closure when the engine is running at normal firing speeds, since it prevents advance of the actuator (46). At lower speeds, insufficient for throwing the weights 54, the feeler represents the sole control.

Figure 9:
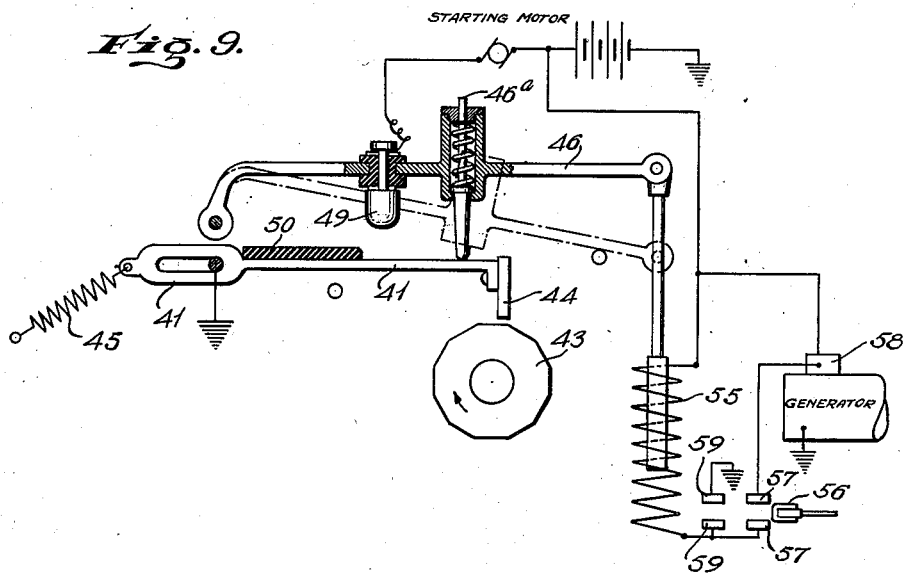
Fig. 9 illustrates a method of electrical operation of the same type of feeler mechanism as shown in Fig. 7.

Fig. 9 represents a further system of automatic throw-off applied to the reciprocating feeler of Fig. 7. In this case, the feeler 41 is related in the same way to its actuating lever 46, as above described and the circuit closing means are the same, but the lever is depressed in this case by the pull of a solenoid 55, connected in circuit between the generator and the starting battery under the control of an operator's switch member 56. When this switch is closed, current from the battery flows through the solenoid and the switch contacts 57 and through the generator brushes to ground, thus depressing the lever 46 and cranking the engine as before. When the generator reaches an engine-firing speed, the direction of the current in the solenoid 55 reverses until the generator cut-out 58 functions, whereupon the solenoid becomes short circuited, as will be understood and the pull on the lever ceases and the feeler resumes its normal protective position. It will be recognized that for this purpose the solenoid is connected across the usual cut-out gap not shown, because well understood. The auxiliary contacts 59 are present for grounding the solenoid by a further movement of the switch member 56 in the event that a good ground has not been initially established through the generator brushes, because of dirt thereunder.

Figure 10:
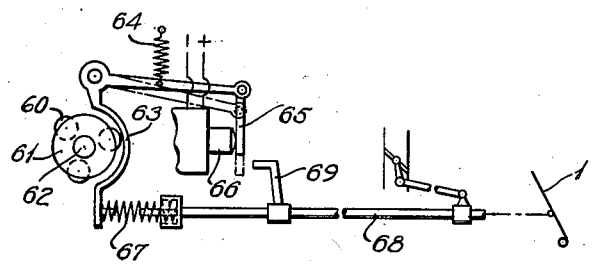
Fig. 10 illustrates still another type of feeler arrangement.

The form of feeler element shown in Fig. 10 is arranged for co-action with a set of centrifugal balls 60 housed within the rotating member 61 and adapted to protrude through holes in its periphery under any very moderate engine speed. Preferably this part is carried on a high speed shaft 62 driven from the crank shaft and the feeler element marked 63 is a bell crank sensitively hung and adapted to be encountered by the balls, being normally held out of their path by a light spring 64. It carries a selector latch 65 pivoted on the end of its long arm and normally in a position in front of the starting switch button. When the push rod 68, corresponding to rod 2 in the other figures is advanced, it imposes a pressure on the curved arm of the feeler through a spring 67 which is only slightly stronger than spring 64. If the part 61 is rotating and the balls distended this movement of the feeler will bring it into contact with the balls and be resisted thereby and further advance of the push rod 68 will merely compress the spring 67. If, however, the part 61 is stationary, the feeler shoe 63 will move against the shell of the body 61 and in so doing shift the latch 65 into the path of a bracket arm 69 on the push rod 68, so that its continued advancing movement will operate the cranking agency through the latch 65. In this case, the push rod 68 is shown connected in the usual way to the engine throttle, the pedal 1 in this case being an accelerator pedal. During normal engine operation, the feeler shoe 63 may be in more or less constant engagement with the fly balls, but by virtue of its arcuate shape, the engagement is practically noiseless. By resort to an overthrowing type of throttle, as in Fig. 1, or an overrunning throttle link as in Fig. 4, the contact between the feeler and balls can be avoided except when the feeler is functioning.

I claim:

1. In an automotive control system, the combination with a rotating surface of polygonal formation to which motion is normally imparted from the engine crank shaft, a feeler subject to displacement by contact therewith, an operating member for advancing the feeler into engagement with said polygonal surface and means for translating the effect of such displacement.

2. In an engine control system, the combination with an engine-driven part, a displaceable feeler movable into contact with said part and subject to displacement thereby when the engine is firing, means for cranking the engine with the feeler in contact with said part and means for holding the so contacting feeler against displacement by the motion due to cranking.

3. In an automotive control system, the combination with an engine-driven part, a feeler and spring to be displaced thereby, an operator's control member having a lost motion connection with said feeler and its spring adapted to engage the feeler with said part and a device actuated by said member.

4. In an automotive control system, the combination with an engine throttle, an operator's control member having connections for operating the same and also for operating the cranking circuit of the engine, a feeler movable on the operation of said member into engagement with an engine-driven part and adapted to be displaced by such engagement and means whereby the condition of displacement or non-displacement of said feeler controls the functioning of said operator's member.

5. In an automotive engine control, the combination with a rotating engine-driven part, of a feeler, an accelerator pedal connected thereto adapted to move the feeler into contact with said part for displacement thereby if said part is rotating and means whereby the non-displacement of said feeler limits the movement of said pedal.

6. In an automotive control system, the combination with the engine throttle, an accelerator pedal connected to establish by its full depression a predetermined opening of said throttle suitable for cranking, a cranking device rendered operative by such full depression, a movable surface driven by the engine, a feeler advanced into engagement therewith by said pedal and adapted to be displaced by such engagement, and means whereby such displacement blocks the action of said cranking device.

7. In an automotive control system, an accelerator pedal connected to the engine throttle with connections for operating a cranking device, and means controlling said operation comprising an engine-driven part, a plunger moved by said pedal and carrying a resiliently mounted feeler adapted for engagement by said part to control the path of movement of said plunger, and a cranking device having operative connections with said plunger.

8. In an automotive control system, a pedal, a cranking device to be operated thereby and means for controlling such operation comprising an engine driven part, a plunger resiliently carrying a feeler for contact with and displacement by said part, said feeler laterally displacing said plunger when it is itself displaced by said driven part and means connected with said plunger for operating said cranking device when not laterally displaced.

9. In an engine control system, an element adapted for connection with an engine-driven part and subject to displacement in either of two directions according to the direction of motion of said part, an operating member adapted to establish such connection and a device controlled by said member according to its displacement or non-displacement.

10. In automotive engine control, an operator's member, an engine-driven part, a feeler connected to said member and adapted to be advanced thereby into contact with said driven part, said feeler having a non-metallic surface for such contact and adapted to respond to such contact when said part is in motion and means for translating the effect of such response to the control of the engine.

JOHN GOOD.